UNITED STATES PATENT OFFICE.

LUCIEN A. TARTIERÈ, OF NEW YORK, N. Y.

IMPROVEMENT IN FIRE AND WATER PROOF COMPOSITIONS FOR CEILINGS, WALLS, AND FLOORS.

Specification forming part of Letters Patent No. 138,956, dated May 13, 1873; application filed March 25, 1873.

*To all whom it may concern:*

Be it known that I, LUCIEN A. TARTIERÈ, of the city and county and State of New York, have invented a certain Fire and Water Proof Composition, intended to be used in the construction of fire-proof roofs, floors, walls, and ceilings, of which the following is a specification:

The nature of my invention consists in mixing sulphate of lime and silicate of lime with coke-dust, sand, or other suitable article, for the production of a fire and water proof material for fire-proof buildings.

Sulphate of lime or plaster of Paris has been successfully used in combination with sand, coke-dust, and other similar material for fire-proof construction. The combination, with such material, of a suitable hydraulic lime, to render the composition alike impervious to the action of water and to combustion, has been regarded as a great desideratum in the construction especially of roofs.

I have found, after repeated experiments with the several hydraulic limes obtainable, that the French lime, known in commerce as the hydraulic lime of Teil, furnishes the requisite proportion of silicate of lime, and that, by the methods I have devised, the combination is rendered entirely practicable, and the resultant compound is found to possess all necessary qualities of strength, tenacity, &c.

Teil hydraulic lime, found in the town of Teil, in the Department of Ardèche, France, consists of lime, 78.29; silex, 18.02; alumina, 1.80; quartz, 1.71; and has remarkable properties for resisting the action of sea-water.

I use these articles in the proportions and manner following: Take of sulphate of lime or calcined plaster of Paris, three parts by weight; the hydraulic lime of Teil, two parts; of coke-dust, five parts. The sulphate of lime is first mixed with a suitable quantity of water. The hydraulic lime and coke-dust are thoroughly mixed, dry, and, when so mixed, are quickly incorporated in the plaster mortar. The compound is then cast in molds of the proper form, and quickly sets and hardens.

Such material is strong, tenacious, and durable, and possesses the special qualities claimed—that is, is impervious to water and incombustible.

What I claim as my invention, and desire to secure by Letters Patent, is—

The compound composed of plaster of Paris and the hydraulic lime of Teil, with coke-dust or other suitable material, substantially in the proportions and for the purposes set forth.

LUCIEN A. TARTIERÈ.

Witnesses:
WM. T. VAN ZANDT,
CHARLES M. PLUMB.